US011881085B2

(12) United States Patent
Davis et al.

(10) Patent No.: US 11,881,085 B2
(45) Date of Patent: *Jan. 23, 2024

(54) METHOD AND SYSTEM FOR A STACKED SYMBOL GAME

(71) Applicant: Epic Tech, LLC, Suwanee, GA (US)

(72) Inventors: Steven Wesley Davis, Suwanee, GA (US); Donald James Rollo, III, Dacula, GA (US)

(73) Assignee: Epic Tech, LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,093

(22) Filed: Oct. 26, 2021

(65) Prior Publication Data

US 2022/0130211 A1 Apr. 28, 2022

Related U.S. Application Data

(63) Continuation of application No. 16/806,850, filed on Mar. 2, 2020, now Pat. No. 11,164,424, which is a (Continued)

(51) Int. Cl.

*G07F 17/32* (2006.01)
*G06Q 50/34* (2012.01)
*G07F 17/34* (2006.01)

(52) U.S. Cl.

CPC ......... *G07F 17/3267* (2013.01); *G06Q 50/34* (2013.01); *G07F 17/3211* (2013.01); *G07F 17/34* (2013.01)

(58) Field of Classification Search

CPC .. G07F 17/3267; G07F 17/3211; G07F 17/34; G06Q 50/34

(Continued)

(56) References Cited

U.S. PATENT DOCUMENTS 8,096,869 B2 * 1/2012 Yoshimi .............. G07F 17/3213 463/16
2013/0184049 A1 * 7/2013 Welty .................... G07F 17/326 463/20

(Continued)

*Primary Examiner* — Allen Chan

(74) *Attorney, Agent, or Firm* — Baker Donelson; Carl M. Davis, II

(57) ABSTRACT

A gaming system wherein a first reel strip is selected from a set of reel strips for a first game. The first reel strip has a set of first consecutive symbol positions and a set of second consecutive symbol positions, each associated with a plurality of symbols and the second consecutive symbol positions comprise at least two consecutive identical symbols. The first reel strip is then displayed within at least one reel. If the user desires to play one or more additional games, the system selects and displays at least one additional reel strip from a set of reel strips. The additional reel strip has a set of first consecutive symbol positions and a set of second consecutive symbol positions, each associated with a plurality of symbols, and the second consecutive symbol positions comprise fewer consecutive identical symbols than were present in the previous game. This process is repeated until a reel strip is selected which has no consecutive identical symbols in the second consecutive identical symbol positions. If another request to play an additional game is received from the user, the system may repeat the first selection step and all steps that follow until no further requests to play are received from the user.

51 Claims, 14 Drawing Sheets

Related U.S. Application Data continuation of application No. 15/942,814, filed on Apr. 2, 2018, now Pat. No. 10,614,668.

(60) Provisional application No. 62/480,613, filed on Apr. 3, 2017.

(58) Field of Classification Search
USPC .......................................................... 463/20
See application file for complete search history.

(56) References Cited

U.S. PATENT DOCUMENTS

| | | | | |
|---|---|---|---|---|
| 2015/0031436 | A1* | 1/2015 | Suda | G07F 17/3248 463/20 |
| 2015/0105136 | A1* | 4/2015 | Delekta | G07F 17/34 463/20 |
| 2015/0235511 | A1* | 8/2015 | Zoble | G07F 17/3213 463/20 |
| 2016/0078714 | A1* | 3/2016 | Gilmore | G07F 17/3267 463/20 |

* cited by examiner

METHOD AND SYSTEM FOR A STACKED SYMBOL GAME

CROSS-REFERENCE TO RELATED APPLICATIONS

This application claims the benefit of U.S. Provisional Application No. 62/480,613 filed Apr. 3, 2017, entitled "Method and System for a Stacked Symbol Game," which is incorporated by reference herein in its entirety.

BACKGROUND

The present invention relates to gaming machines for the playing of games of skill or chance and, more particularly, to special features of games which may be offered on such machines. Standard gaming devices and games display (mechanically, electronically simulated, or otherwise) a number of reels marked with a number of symbols. In the standard game, the reels spin and stop randomly. If the pattern of symbols displayed on the stopped reels corresponds to a predetermined winning pattern, the device awards the player with a prize. In some games, a skill element is required in order to win the game, such as nudging one or more of the reels in a particular direction in order to create a winning pattern.

Machines and games that offer novel and stimulating variations on the basic reel-based games, yet comply with the strict regulatory restrictions set forth for the gaming industry, are eagerly sought after and there is intense competition between manufacturers to innovate. As such, vast amounts of time, energy, and financial resources are put into the development of new gaming concepts, such as those described and claimed herein.

SUMMARY OF THE INVENTION

The present invention meets the need in the art by providing a machine for entertainment of playing one or more consecutive games, comprising a plurality of reels, each reel having a plurality of reel sequential symbol positions and a matrix comprising a matrix height of a predetermined number of the reel sequential symbol positions and a matrix width of the number of reels on which a play of a game and an outcome of the play of the game is displayed, and a plurality of reel strips, each having a first set of consecutive symbol positions and a second set of consecutive symbol positions, said each symbol position associated with one of a plurality of symbols randomly selected and said second set of consecutive symbol positions comprising at least two identical symbols of the plurality of symbols, and for each subsequent one of the one or more games the second set of consecutive symbol positions comprising a number of consecutive identical symbols different than the number in the second set in the prior play of the game. A device is configured for selecting for play of the game a respective one of the plurality of reel strips for each of the reels, which first set and second set of consecutive symbol positions populates the plurality of reel sequential symbol positions for the respective reel. A display displays the matrix during and after the play of the game that involves means for moving the plurality of reels, whereby each of reels moves the reel sequential symbol positions through the display until stopped, and the display thereafter displays the symbols in the matrix of the sequential symbol positions in the predetermined matrix height and matrix width.

In another aspect, the present invention provides a method of playing one or more consecutive games on a machine for entertainment comprising the steps of:

(a) providing a plurality of reels, each reel having a plurality of reel sequential symbol positions;

(b) defining a matrix comprising a matrix height of a predetermined number of the reel sequential symbol positions and a matrix width of the number of reels, on which a play of a game and an outcome of the play of the game is displayed;

(c) selecting a reel strip from a plurality of reel strips, each reel strip having a first set of consecutive symbol positions and a second set of consecutive symbol positions, said each symbol position of the first set of consecutive symbol positions populated with a respective one of a plurality of the symbols randomly selected and said second set of consecutive symbol positions comprising at least two identical symbols of the plurality of symbols, and for each subsequent one of the one or more games the second set of consecutive symbol positions comprising a number of consecutive identical symbols different than the number in the second set in the prior play of the game;

(d) selecting a respective one of the plurality of reel strips for each of the reels, which first set and second set of consecutive symbol positions populates the plurality of reel sequential symbol positions for the respective reel;

(e) providing a display for display of the matrix during and after the play of the game; and (f) moving the plurality of reels during the play of the game, whereby each of reels moves the reel sequential symbol positions through the display until stopped, and thereafter the display displays the symbols in the matrix of the sequential symbol positions.

In another embodiment, the invention is directed to a gaming system comprising at least one input device, at least one display device configured to display a game comprising a matrix of reels, and at least one processor. The processor is configured to receive a first request from a user to play a first game and, in response to the first request, select at least one first reel strip from a set of reel strips. The first reel strip has a set of first consecutive symbol positions and a set of second consecutive symbol positions, each associated with a plurality of symbols and the second consecutive symbol positions comprise at least two consecutive identical symbols. The processor may then display the first reel strip within at least one reel, receive an additional request from the user to play an additional game, and in response to the additional request, select at least one additional reel strip from a set of reel strips. The additional reel strip has a set of first consecutive symbol positions and a set of second consecutive symbol positions, each associated with a plurality of symbols and the second consecutive symbol positions comprise fewer consecutive identical symbols than were present in the previous game. For each further request from the user to play an additional game that is received, the processor may repeat the "selected at least one additional reel strip" step and the "display the additional reel strip step" until a reel strip is selected which has no consecutive identical symbols in the second consecutive identical symbol positions. If a request to play an additional game is received from the user after a reel strip is selected which has no consecutive identical symbols in the second consecutive identical symbol positions, the processor may select at least one additional reel strip from a set of reel strips. The additional reel strip has a set of first consecutive symbol positions and a set of second consecutive symbol positions, each associated with a plurality of symbols, and the second consecutive symbol positions comprise two groups of consecutive identical symbols which fill all of the symbol positions within the second consecutive symbol positions. The processor may then display the additional reel strip within the at least one reel and if another request to play an additional game is received from the user, repeat the "select at least one first reel strip" step and all steps that follow until no further requests to play are received from the user.

In another embodiment, the invention is directed to methods comprising the above (and herein) steps and non-transitory computer readable medium recording a program for controlling a computer to function as is set forth above and herein.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

DESCRIPTION OF SOME EMBODIMENTS

Reference will now be made in detail to embodiments of the present systems and methods, one or more examples of which are illustrated in the accompanying drawings. Each example is provided by way of explanation, not limitation of the present system. In fact, it will be apparent to those skilled in the art that modifications and variations can be made to the present system and methods without departing from the scope or spirit thereof. For instance, features illustrated or described as part of one embodiment may be used in another embodiment to yield a still further embodiment. Thus, the present system and methods cover such modifications and variations as come within the scope of the appended claims and their equivalents.

Figure 3:
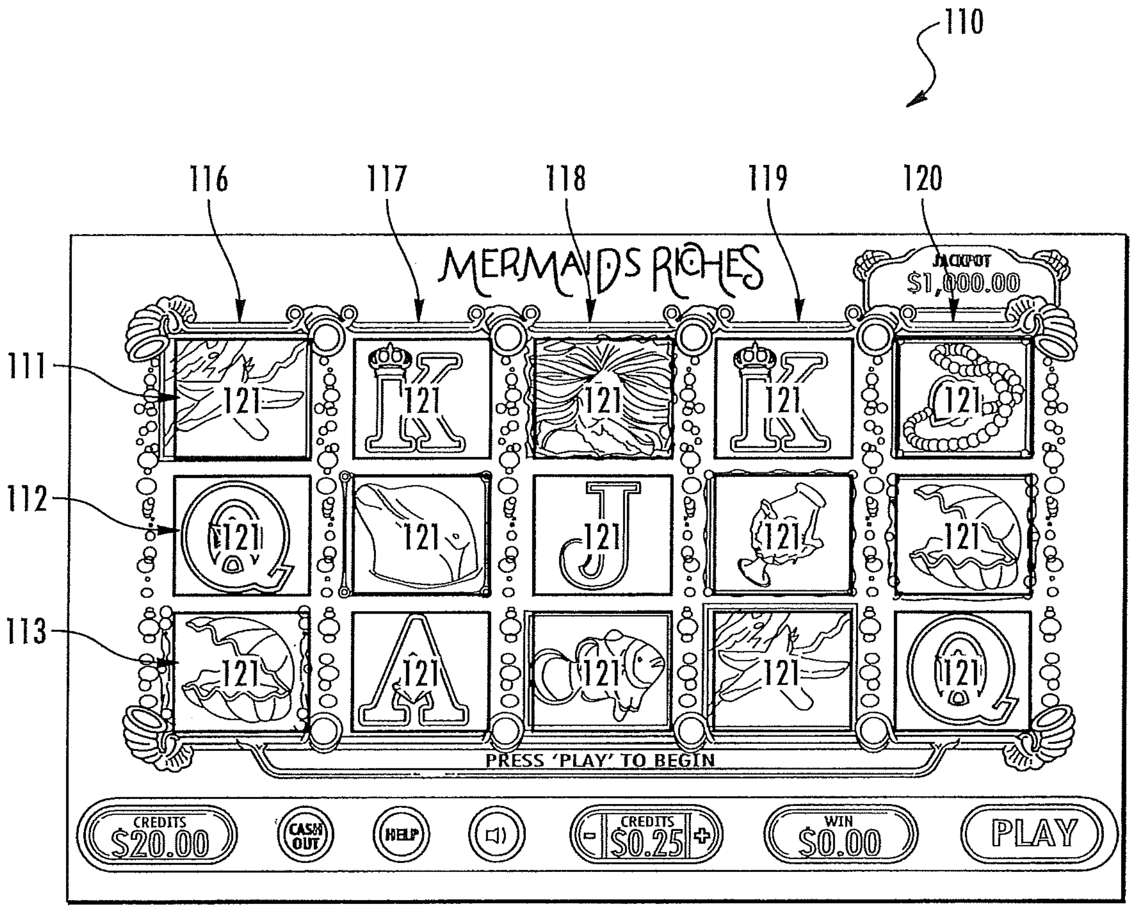
FIG. 3 is an embodiment of the game display of the present invention.
Figure 4:
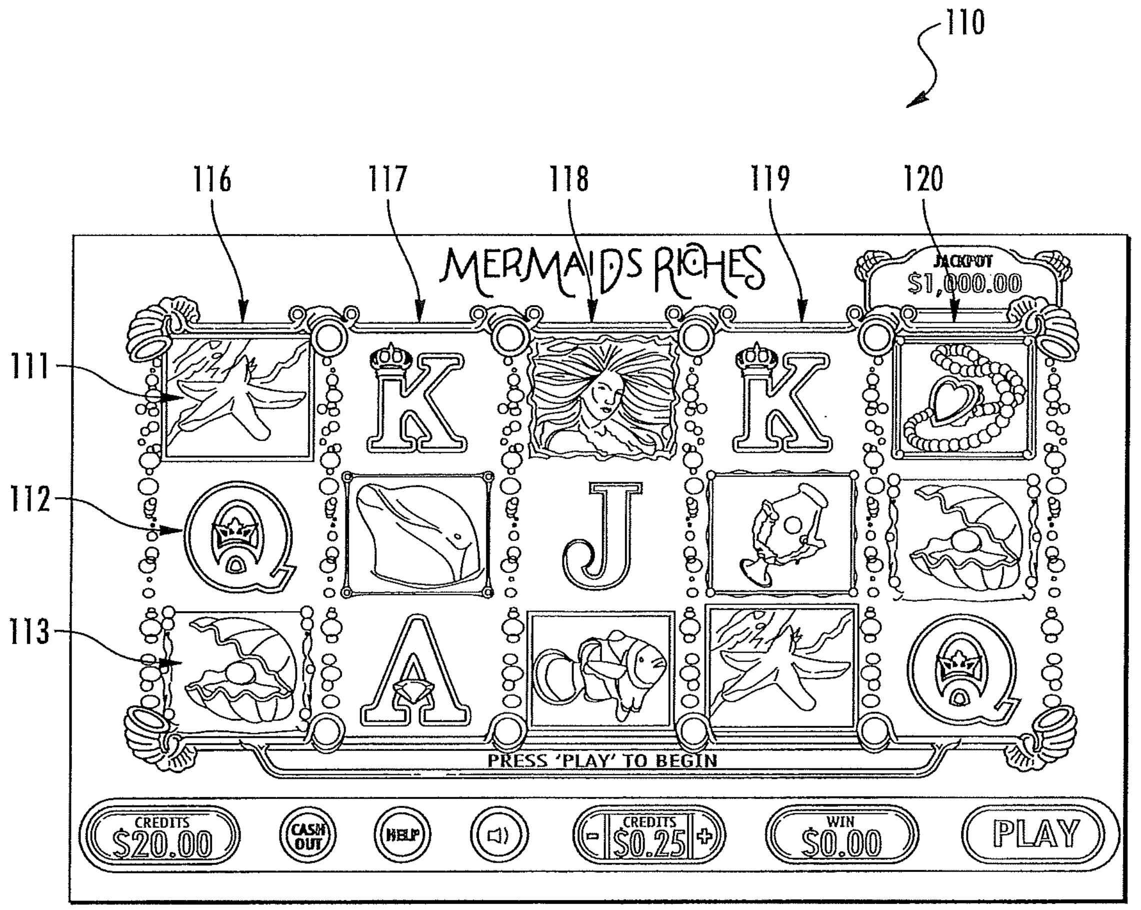
FIG. 4 is an embodiment of the game display of the present invention.
Figure 5:
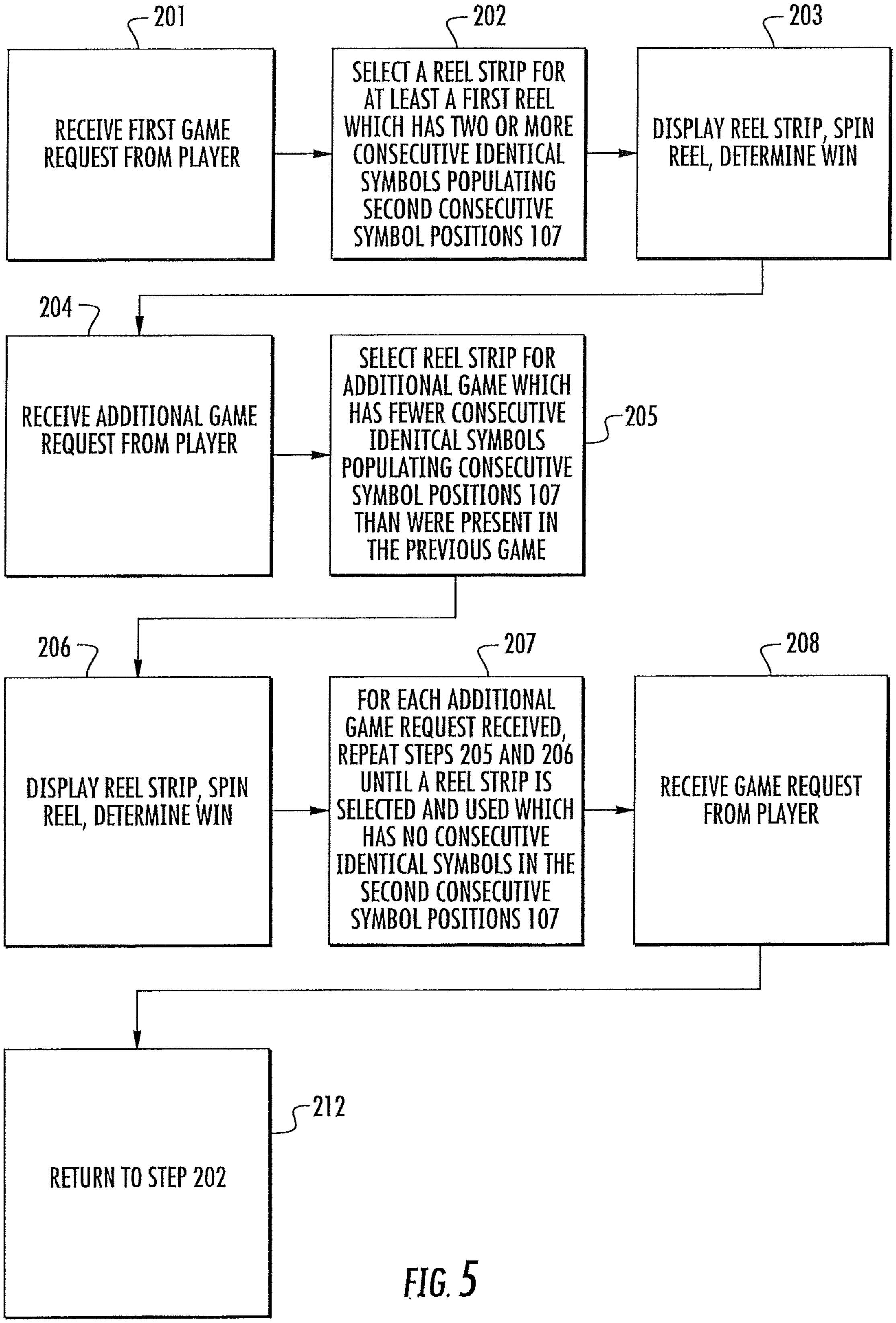
FIG. 5 is a flow chart showing features of embodiments.
Figure 6:
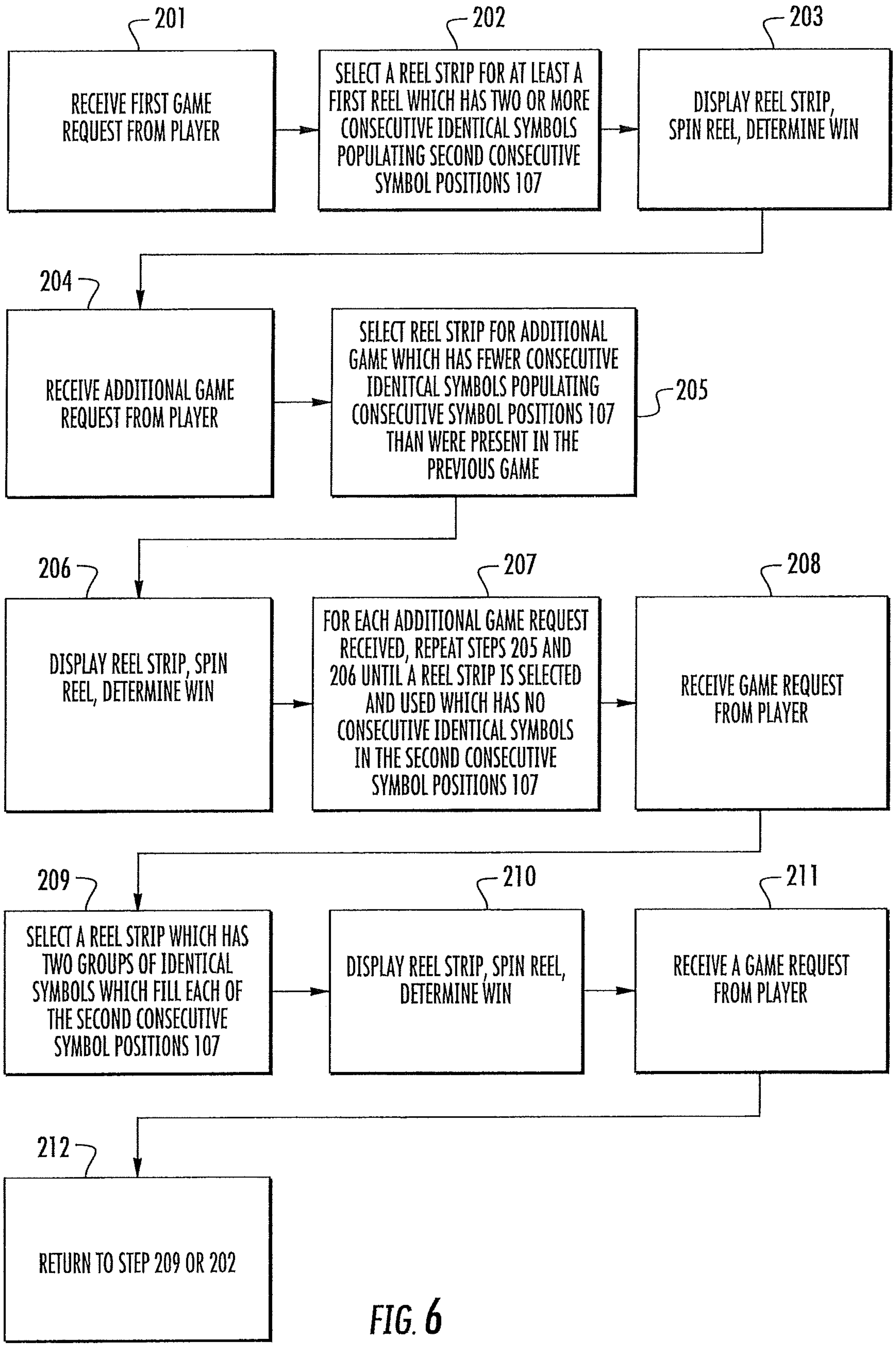
FIG. 6 is a flow chart showing features of embodiments.

The present invention is directed generally to a novel and exciting gaming machine, system, and methodology. In an embodiment, shown in FIGS. 1-4, the invention is directed to a game based upon one or more simulated rotatable reels, displayed in a matrix format 110 of columns 116, 117, 118, 119, and 120 and rows 111, 112, 113, 114, and 115. In an embodiment, each reel is displayed as a vertical matrix column 116, 117, 118, 119, and 120 and contains one or more symbol positions 121 within each column. Any number of reels (columns) may be utilized in the present invention. In some embodiments, three, four, or five reels may be displayed. Similarly, any number of rows 111, 112, 113, 114, and 115 may be displayed. In an embodiment, the number of rows displayed at any given time may be three, four, or five rows, but the invention should not be so limited. Regardless of the number of matrix rows displayed to a participant, such as the three rows 111, 112, and 113, set forth in FIG. 3, the number of rows (and symbol positions 121) in any particular reel/column may be greater than the number of rows displayed. For example, a particular game may display five reels, each having three displayed rows of symbol positions, for a total of 15 displayed symbol positions (such as is set forth in FIG. 3). However, each of those five reels may actually comprise 20, 30, 50, 100, or any other number of rows or symbol positions 121 which are not displayed.

In an embodiment, each of the reels that is displayed in a column for a particular game is selected from a database of reel strips 100. The database may contain any number of reel strips 101, 102, 103, 104, and 105. In an embodiment, some reel strips may be related. For example, there may be a particular set of reel strips available for reel 1, a different set of reel strips available for reel 2, and yet a different set of reel strips available for reel 3. Alternatively, the reel strip for each reel may be selected from a common pool of reel strips.

Each pool or set of reel strips may contain any number of reel strips. In an embodiment, the processor selects reel strips from the database prior to each game to determine the reel strip that will displayed for each reel. This selection may be random or predetermined. In an embodiment, the system may first randomly select a reel strip for reel 1, then randomly select a reel strip for reel 2, and then randomly select a reel strip for reel 3 (or in any other order known). These selections may occur nearly simultaneously. Alternatively, the processor may select reel strips for all available reels simultaneously. Similarly, the reel strips may be displayed within the reel positions in any order known in the art or may be displayed simultaneously.

In an embodiment, the database may contain a set of reel strips that are associated with multiple reels. For example, set "ABC" of reel strips may contain a particular reel strip for reel 1, a particular reel strip for reel 2, and a particular reel strip for reel 3. In this embodiment, the processor may separately (randomly or predeterminedly) select each reel strip within the set or may selected set ABC itself and thereby display the particular reel strip associated with each reel within the set.

Each reel strip may contain any number of symbol positions 121, each configured to display a symbol. For example, each reel strip may contain 20, 30, 50, or 100 (or any other number) symbol positions 121. In an embodiment of the invention, each reel strip has a finite and/or predetermined number of symbol positions 121. In another embodiment, the number of symbol positions 121 in each reel strip is varies. In a particular embodiment, the number of symbol positions 121 in each reel strip is randomly determined for each game or for a set of games.

Figure 1:
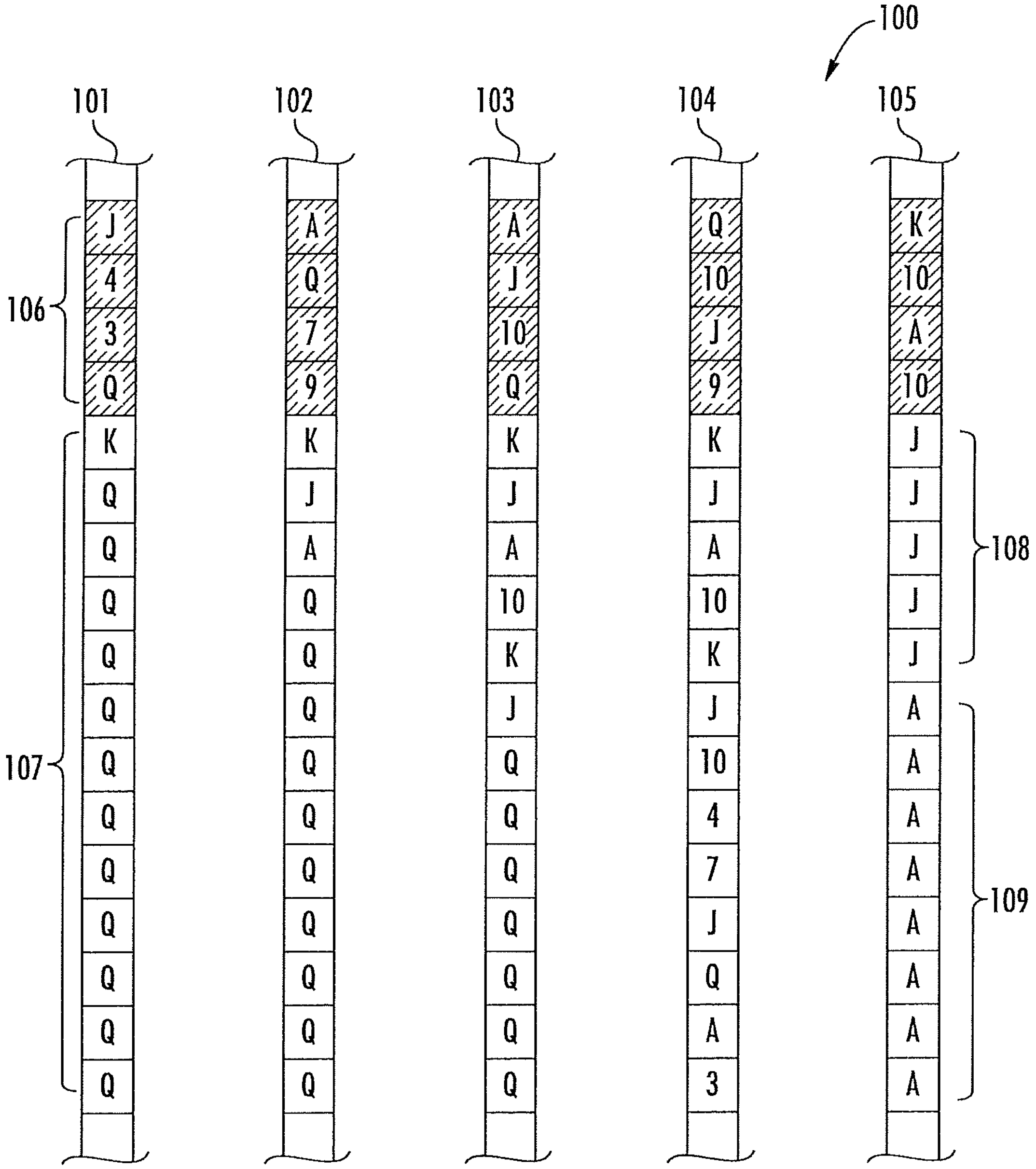
FIG. 1 is a schematic representation of reel strips in an embodiment of the present invention.
Figure 2:
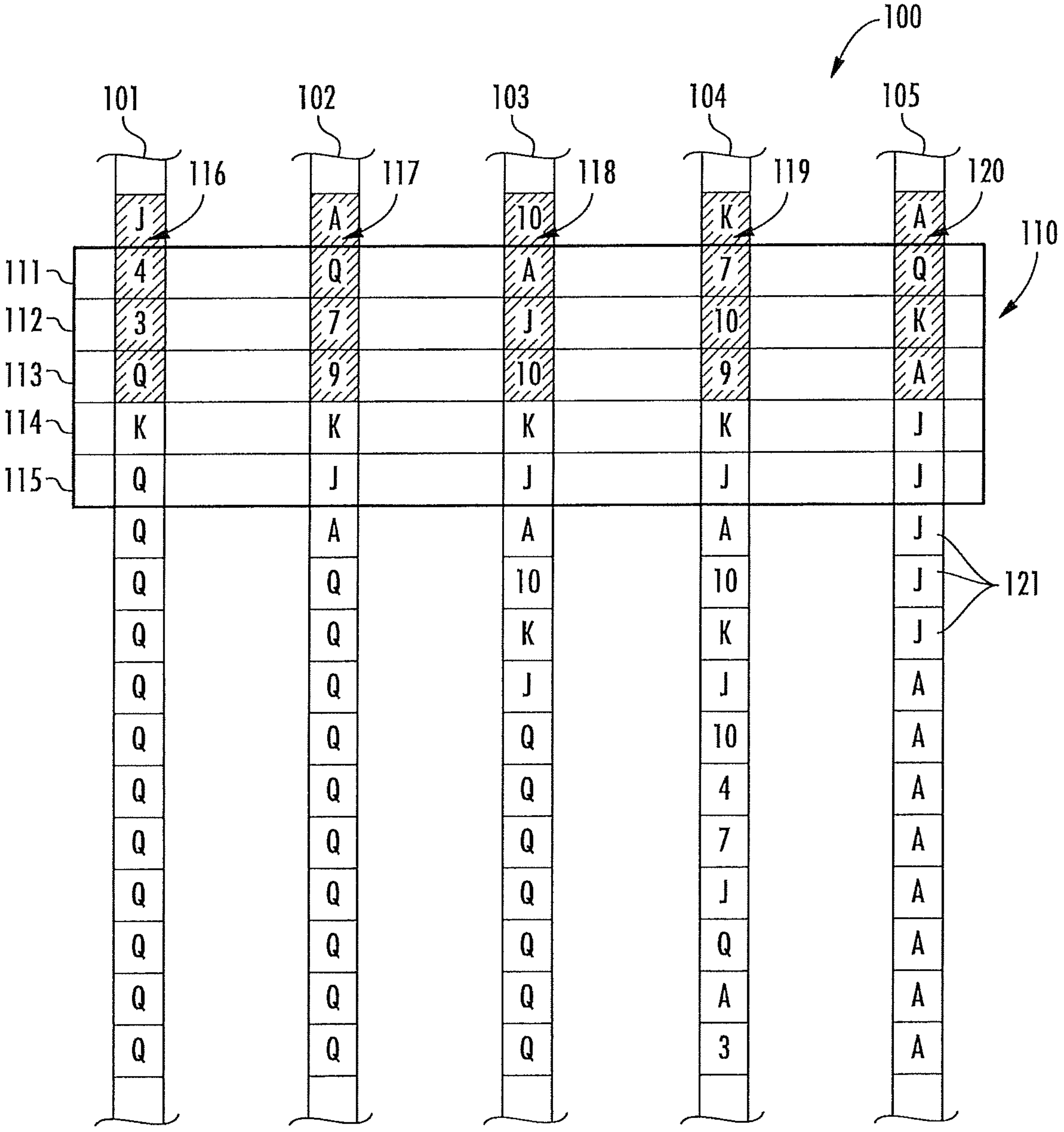
FIG. 2 is a schematic representation of reel strips in an embodiment of the present invention.

In a particular embodiment, shown in FIG. 1, at least one reel strip 101, 102, 103, 104, and 105 (but could include some, a majority or all of the reel strips) contains a predetermined number of first consecutive symbol positions 106 and a predetermined number of second consecutive symbol positions 107. In an embodiment, the number of first consecutive symbol positions 106 and the number of second consecutive symbol positions 107 are the same. In an embodiment, the number of first consecutive symbol positions 106 and the number of second consecutive symbol positions 107 are the different. In another embodiment, the number of first consecutive symbol positions 106 and the number of second consecutive symbol positions 107 are different from one another but remain constant for each reel strip and/or remain the same for each game played. For example, a first reel strip may have 20 first consecutive symbol positions and 30 second consecutive symbol positions (different from each other), but each and every reel strip may have this 20/30 setup.

In an embodiment, the number of first consecutive symbol positions 106 is the same for each reel strip and/or remain the same for each game played. In an embodiment, the number of second consecutive symbol positions 107 is the same for each reel strip and/or remain the same for each game played.

In an embodiment, the first consecutive symbol positions 106 may be randomly populated with symbols. In another embodiment, the first consecutive symbol positions 106 may be populated with predetermined symbols which are not identical to one another. In an embodiment, the first consecutive symbol positions 106 may be populated with symbols that are not necessarily identical to one another, but are predetermined and are the same for some or all of the reel strips. In such an embodiment, the symbols in the first consecutive symbol positions 106 may remain the same for each game played. In an embodiment, the symbols populating the first consecutive symbol positions 106 may be different for each reel strip. In another embodiment, the symbols populating the first consecutive symbol positions 106 may be different for at least two reel strips. In another embodiment, at least one symbol populating the same symbol position 121 within the first consecutive symbol positions 106 may be different for at least two reel strips. In yet another embodiment, at least one symbol populating the same symbol position 121 within the first consecutive symbol positions 106 may be different for at least two games played. In a further embodiment, at least one symbol populating the same symbol position 121 within the first consecutive symbol positions 106 may be different for the first two games played by any player.

In an embodiment, the second consecutive symbol positions 107 may be populated with consecutive identical symbols. Each reel strip may have a different identical symbol populated in its second consecutive symbol positions 107 or some reel strips may have the same identical symbol populated into their second consecutive symbol positions 107. The identical symbols may be predetermined or may be randomly selected to populate the second consecutive symbol positions 107. The second consecutive symbol positions 107 may be populated with identical symbols in every symbol position within the second consecutive symbol positions 107, in an embodiment. In an embodiment, at least one second consecutive symbol position 107 comprises a non-identical symbol. In other embodiments, some consecutive identical symbols, or no identical symbols may populate the second consecutive symbol positions 107. For example, in FIG. 1, reel strip 101 contains 13 second consecutive symbol positions 107 and 12 consecutive identical symbols ("Q") and reel strip 103 contains 13 second consecutive symbol positions 107 and 7 consecutive identical symbols ("Q"). Similarly, the second consecutive symbol positions 107 may be populated with one or more groups of different identical symbols. For example, in FIG. 1, reel strip 105 contains 13 second consecutive symbol positions 107 and two groups of consecutive identical symbols: 5 identical symbols ("J") and 8 other identical symbols ("A"). The groups of consecutive identical symbols need not be consecutive to each other and could, for example, be separated by one or more non-identical symbols within the reel strip.

The number of symbol positions in the first consecutive symbol positions 106 and the second consecutive symbol positions 107 may vary. For example, if a reel strip comprises 50 symbol positions, 20 of those symbol positions may comprise first consecutive symbol positions 106 and 30 of those symbol positions may comprise second consecutive symbol positions 107. Similarly, if a reel strip comprises 50 symbol positions, 30 of those symbol positions may comprise first consecutive symbol positions 106 and 20 of those symbol positions may comprise second consecutive symbol positions 107. Any other variation is encompassed herein.

In an embodiment, the processor consults a weighted table to determine the combination of reel strips (the "reel strip combination") that will be selected for a particular game. In this embodiment, there may be a finite number of reel strips and/or reel strip combinations, each having an associated weight. For example, if a game has 5 reels and 11 reel strips per reel (55 total reel strips), there may be 161,051 possible reel strip combinations. Each reel strip combination may be associated with a letter, number, or other indicia, or a set of letters, numbers, or other indicia. For example, a set of 5 numbers may be associated with each reel strip combination for a system having 5 reels.

In an embodiment, each reel strip combination has more than one associated weights. In this embodiment, one of the weights may be associated with a base game and one or more weights may be associated with a bonus game.

In an embodiment, the table may be indexed to indicate which reel strip should be selected for each reel. For example, the table may be indexed so that 3/8 indicates that reel strip 8 should be selected for reel 3. In an embodiment, each of the reel strips is unique. For example, reel strip 3 for reel 1 may be different from reel strip 3 for reel 2. With reference to Table 1, the table may be indexed as indicated. In this example, if the processor selects Index #2847 from Table 1, reel 1 will be populated with reel strip 3, reel 2 will be populated with reel strip 1, reel 3 will be populated with reel strip 4, reel 4 will be populated with reel strip 9, and reel 5 will be populated with reel strip 7. Index #2847 may be indicated as 1(reel)/3(associated reel strip), 2/1, 3/4, 4/9, 5/7.

TABLE 1

| Index # | Reel 1 | Reel 2 | Reel 3 | Reel 4 | Reel 5 |
|---|---|---|---|---|---|
| 0001 | 1 | 1 | 1 | 1 | 1 |
| 0002 | 2 | 1 | 1 | 1 | 1 |
| 2847 | 3 | 1 | 4 | 9 | 7 |
| 2848 | 3 | 1 | 4 | 9 | 8 |

In an embodiment, the table additionally comprises one or more subsets of indices. For example, the table could be configured such that if, in game one, Index #0001 is selected, only a subset of the 161,051 possible reel strip combinations would be available in game 2. Similarly, once the Index # is determined for game 2, only a subset of the possible combinations that were available in the second game would be available in game 3. This process may repeat for a defined period of time, defined number of games, or until a defined number of combinations is available, before resetting and making all available combinations available once again.

In another embodiment, multiple weighted tables may be utilized. In this embodiment, in game one, Index #0001 may be selected from Table 1. The processor may then be required to select an index # from a separate table for game 2. Similarly, the processor may be required, for game 3, to select an index # from a third table. Each of the tables may be unique. Again, this process may repeat for a defined period of time, defined number of games, or until a defined number of combinations is available, before referring back to Table 1 and repeating the process. Similarly, separate tables may be utilized for a base game and one or more a bonus games.

In an embodiment of a first game, a participant initiates a play of the game. The processor receives a game request from the participant. The processor may then select a reel strip to be displayed on each of the displayed reels using any of the disclosed processes. With regard to a first reel (which may be any reel within the matrix), a first reel strip will be selected for that reel. The reel strip may be randomly selected in an embodiment, using any method known in the art, such as via use of a random number generator. The selected first reel strip is configured to have a set of first consecutive symbol positions 106 and a set of second consecutive symbol positions 107, each associated with symbols. In an embodiment, the selected first reel strip has at least two symbols in the second consecutive symbol positions 107 which are consecutive and identical. In an embodiment, the selected first reel strip has a plurality of symbols in the second consecutive symbol positions 107 which are consecutive and identical. In an embodiment, the symbols positioned in the first consecutive symbol positions 106 of the selected first reel strip are not consecutively identical to one another.

In an embodiment, after a reel strip is selected and displayed (or simultaneous with the selection and/or display thereof) for at least one reel or for each reel, one or more of the reels may spin. The reels may stop randomly, stop in a predetermined position, or may be stopped manually by the participant. If a winning combination of symbols is displayed (and/or obtained through some exercise of skill by the participant), the participant may win a prize. The winning combination may be determined based upon symbols (matching or otherwise) lining up along a predetermined payline, appearing in predetermined matrix positions, or using any other method known in the art.

In an embodiment, a participant initiates play of a second game. The processor receives a game request from the participant. The processor determines whether the reel strip selected for the first reel during the first game comprised at least two identical symbols in the second consecutive symbol positions 107 and, if so, upon receipt of the second game request, selects a reel strip that has fewer identical symbols in the second consecutive symbol positions 107 than were present in the second consecutive symbol positions 107 in the first game. Notably, the identical symbols in the reel strip selected for the second game need not be the same identical symbols that were utilized in the reel strip of the first game. As an example, if the reel strip selected for the first game contains 10 identical symbols in 12 second consecutive symbol positions 107, the selected reel strip for the second game may comprise 9 or 8 identical symbols in the 12 second consecutive symbol positions 107. The 9 or 8 identical symbols used in the second game could be the same identical symbols (i.e. 10 identical "A"s in game 1, 9 identical "A"s in game 2), or different identical symbols (i.e. 10 identical "A"s in game 1, 9 identical "Q"s in game 2), from those 10 identical symbols utilized in the first game. This process, in an embodiment, may repeat multiple times. In a particular embodiment, this process may repeat until a reel strip having no identical symbols in the second consecutive symbol positions 107 is selected and displayed for the first reel. If an additional game request is then received by the processor, the processor may select a reel strip at random or may select a reel strip from a set or subset of reel strips wherein at least two identical symbols populate the second consecutive symbol positions 107. This process may be utilized for each of the reels in the matrix.

In an embodiment, for at least one game, a reel strip is selected for at least one reel (in an embodiment, the first reel) wherein at least two groups of consecutive identical symbols are displayed within the second consecutive symbol positions 107. For example, if the reel strip contains thirteen second consecutive symbol positions 107, five consecutive identical symbols 108 may populate five of the symbol positions and eight other identical symbols 109 may populate the other eight symbol positions (see reel strip 105 in FIG. 1). Similarly, if the reel strip contains thirteen second consecutive symbol positions 107, four consecutive identical symbols may populate four of the symbol positions 107, five other identical symbols may populate five of the symbol positions 107, and four additional symbols (optionally, randomly selected) which are not necessarily identical may populate the remaining symbol positions 107. Furthermore, if the reel strip contains thirteen second consecutive symbol positions 107, four consecutive identical symbols may populate four of the symbol positions 107, five other identical symbols may populate five of the symbol positions 107, and four additional identical symbols may populate the remaining four symbol positions 107, such that three groups of identical symbols exist within the second consecutive symbol positions 107. In an embodiment, the at least two groups of consecutive identical symbols fill all of the positions within the second consecutive symbol positions 107, as illustrated in FIG. 1, reel strip 105.

In an embodiment, a reel strip having at least two groups of consecutive identical symbols within the second consecutive symbol positions 107 is selected for the game following the game wherein a reel strip that has no consecutive identical symbols in the second consecutive symbol positions 107 is utilized. If an additional game request is then received by the processor, the processor may select a reel strip at random or may select a reel strip from a set or subset of reel strips wherein at least two identical symbols populate the second consecutive symbol positions 107.

In an embodiment, illustrated in FIG. 1, each reel strip shown may be used in the same reel for successive games. For example, reel 1, game 1 may be illustrated by reel strip 101, wherein the second consecutive symbol positions 107 comprise 13 symbol positions, 12 of which contain identical Q's. Reel strip 102 may represent reel 1, game 2, comprising fewer identical symbols (9 identical Q's) within the 13 second consecutive symbol positions 107. Similarly, reel strip 103 may represent reel 1, game 3, comprising fewer still identical symbols (7 identical Q's) within the 13 second consecutive symbol positions 107. Reel strip 104 may represent reel 1, game 4, comprising no identical symbols within the 13 second consecutive symbol positions 107.

Reel strip 105 may represent reel 1, game 5, comprising two groups (5 identical J's and 8 identical A's) within the 13 second consecutive symbol positions 107. For reel 1, game 6, reel strip 101 or any other reel strip having at least two consecutive identical symbols within the 13 second consecutive symbol positions 107 could be selected. The process could then repeat until no further game requests are received from the user.

Figure 10:
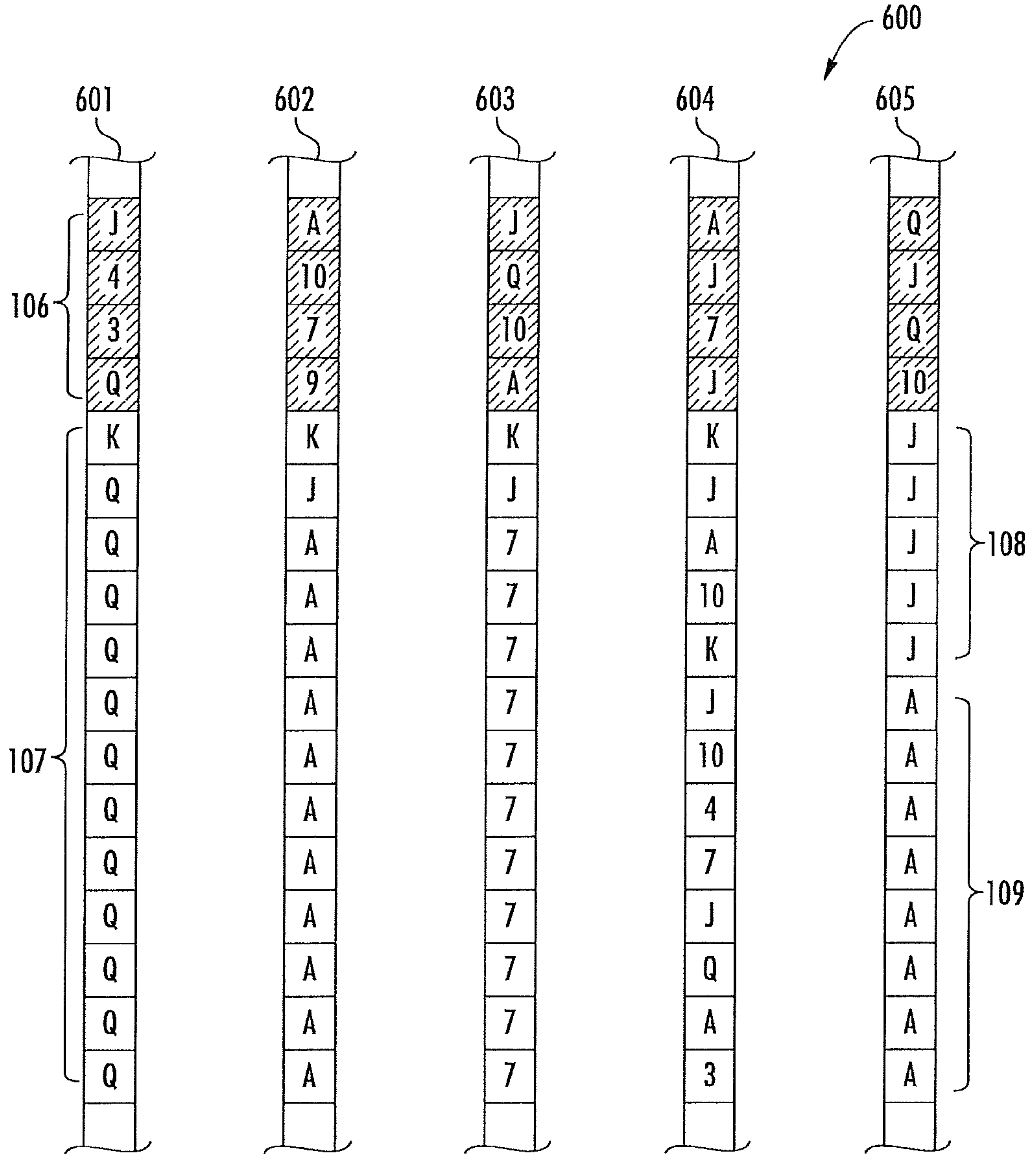
FIG. 10 is a schematic representation of reel strips in an embodiment of the present invention.

In another illustrative embodiment, shown in FIG. 10, reel 1, game 1 may be illustrated by reel strip 601, wherein the second consecutive symbol positions 107 comprise 13 symbol positions, 12 of which contain identical Q's. Reel strip 602 may represent reel 1, game 2, comprising fewer identical symbols (11 identical A's) within the 13 second consecutive symbol positions 107. Similarly, reel strip 603 may represent reel 1, game 3, comprising fewer still identical symbols (10 identical 7's) within the 13 second consecutive symbol positions 107. Reel strip 604 may represent reel 1, game 4, comprising no identical symbols within the 13 second consecutive symbol positions 107. Reel strip 605 may represent reel 1, game 5, comprising two groups (5 identical J's and 8 identical A's) within the 13 second consecutive symbol positions 107. For reel 1, game 6, reel strip 601 or any other reel strip having at least two consecutive identical symbols within the 13 second consecutive symbol positions 107 could be selected. The process could then repeat until no further game requests are received from the user.

Figure 11:
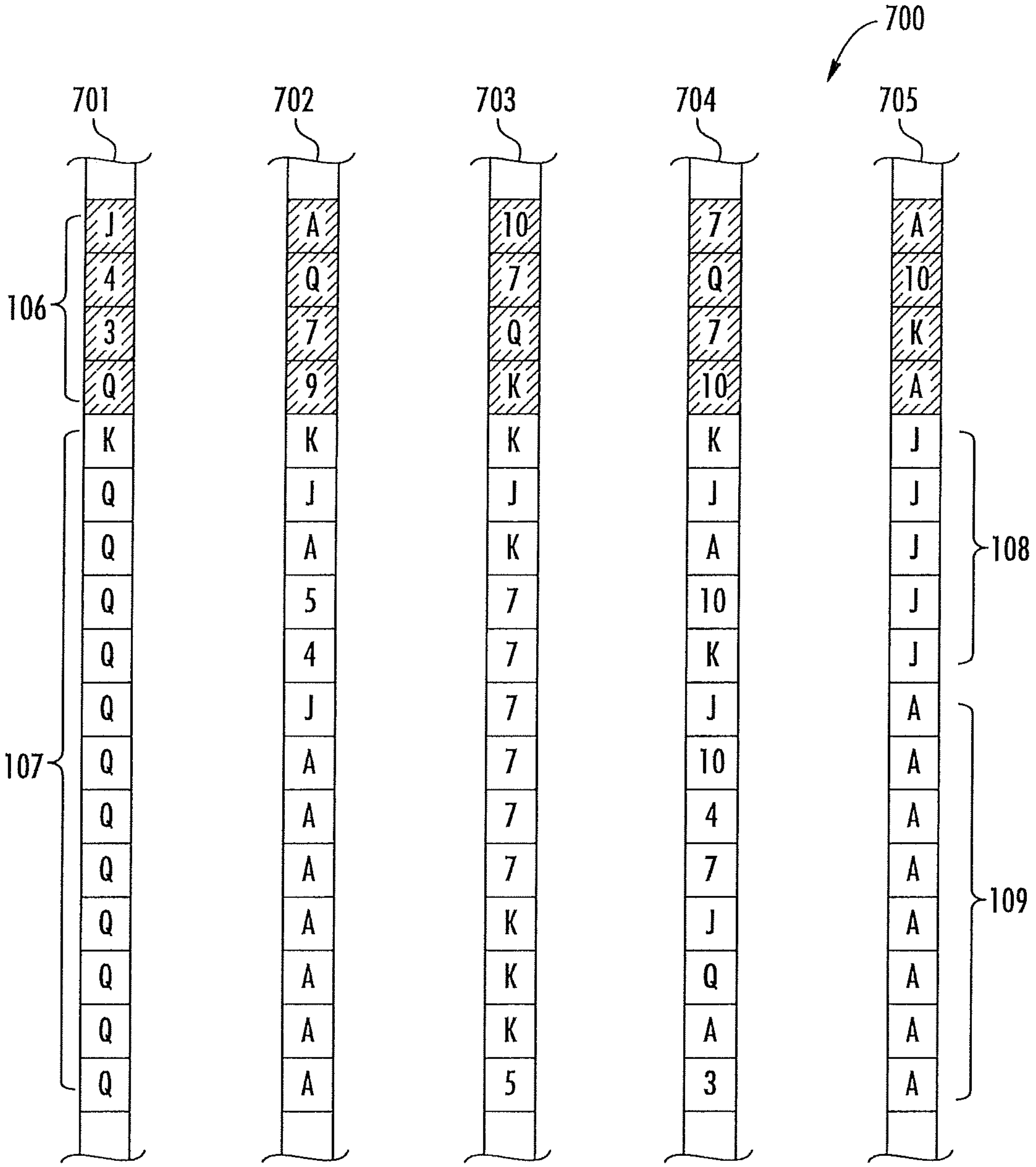
FIG. 11 is a schematic representation of reel strips in an embodiment of the present invention.

In yet another illustrative embodiment, shown in FIG. 11, reel 1, game 1 may be illustrated by reel strip 701, wherein the second consecutive symbol positions 107 comprise 13 symbol positions, 12 of which contain identical Q's. Reel strip 702 may represent reel 1, game 2, comprising fewer identical symbols (7 identical A's) within the 13 second consecutive symbol positions 107. Similarly, reel strip 703 may represent reel 1, game 3, comprising fewer still identical symbols (6 identical 7's and 3 identical K's) within the 13 second consecutive symbol positions 107. Reel strip 704 may represent reel 1, game 4, comprising no identical symbols within the 13 second consecutive symbol positions 107. Reel strip 705 may represent reel 1, game 5, comprising two groups (5 identical J's and 8 identical A's) within the 13 second consecutive symbol positions 107. For reel 1, game 6, reel strip 701 or any other reel strip having at least two consecutive identical symbols within the 13 second consecutive symbol positions 107 could be selected. The process could then repeat until no further game requests are received from the user.

In one embodiment, the quantity of consecutive identical symbols on each reel (i.e. reel 1, reel 2, reel 3, etc.) decreases in each successive game, until no consecutive identical symbols are present. In another embodiment, the quantity of consecutive identical symbols on one or some reels (i.e. reel 1, reel 2, reel 3, etc.) decreases in each successive game, until no consecutive identical symbols are present on those reels. In yet another embodiment, the quantity of consecutive identical symbols on each reel (i.e. reel 1, reel 2, reel 3, etc.) decreases in each successive game, but at different rates, until no consecutive identical symbols are present. For example, each reel may begin with ten identical consecutive symbols in a first game, but in game 2, reel 1 may display 9 consecutive identical symbols, reel 2 may display 3 consecutive identical symbols, and reel 3 may display 8 consecutive identical symbols. In still another embodiment, game one may comprise reel 1 having 10 consecutive identical symbols while reels 2 and 3 have no identical symbols. Game two may show reel 1 having 9 consecutive identical symbols, reel 2 having 10 consecutive identical symbols, and reel 3 still having no consecutive identical symbols. Game three may show reel 1 having 8 consecutive identical symbols, reel 2 having 5 consecutive identical symbols, and reel 3 having 10 consecutive identical symbols. It should be understood that any variation of this type is contemplated by the invention.

Figure 13A:
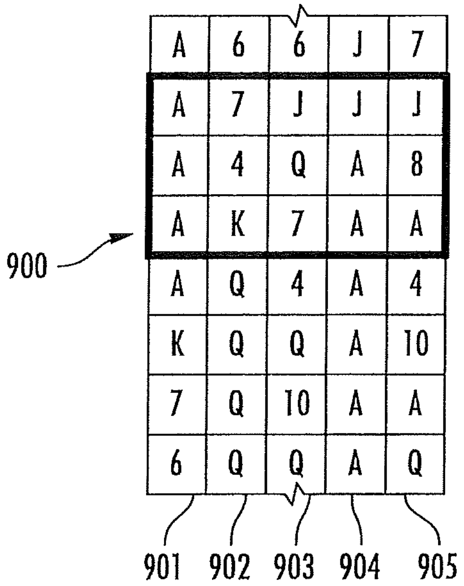
FIGS. 13A, 13B, and 13C are an illustration of an embodiment of the present invention as played in successive games.
Figure 13B:
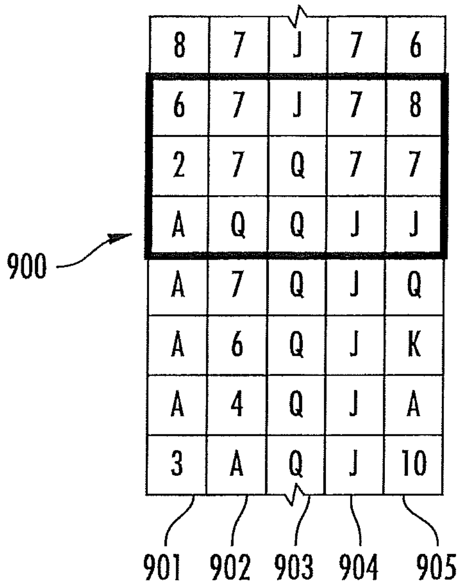
Figure 13C:
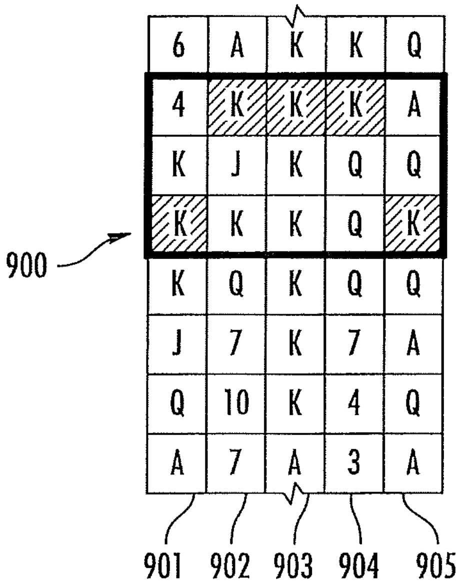

In yet another example, shown in FIG. 13A-C, exemplary successive games are illustrated. The game display 900 illustrates the symbols displayed to the player. The reel strip for each reel, however, has more symbol positions than are shown to the player when the reel stops, as noted above. As the reel "spins," the reel strip advances through the positions shown in the game display 900. In game one (FIG. 13A), when the reels come to rest, reel one 901 displays three consecutive A's in the game display 900, though five consecutive A's are present on the reel strip and would have been seen by the player as the reel was spinning. In game two (FIG. 13B), when the reels come to rest, reel one 901 displays one A in the game display 900, though four consecutive A's are present on the reel strip and would have been seen by the player as the reel was spinning. As is apparent, fewer consecutive identical symbols were present on the reel strip for reel one 901 in game two than were present in game one. In game three (FIG. 13C), when the reels come to rest, reel one 901 displays two K's in the game display 900, though three consecutive K's are present on the reel strip and would have been seen by the player as the reel was spinning. As is apparent, fewer consecutive identical symbols were present on the reel strip for reel one 901 in game three than were present in game two. In an embodiment, it is not necessary that the game display 900 shows fewer consecutive identical symbols in successive games, but only that the reel strip contains fewer consecutive identical symbols in successive games, as the player will be able to see the symbols on the reel strip as the reel spins. In an embodiment, the reel spins at a rate which allows the player to see the symbols that are displayed therein before the reel comes to rest. In another embodiment, the game display 900 shows fewer consecutive identical symbols after the reels have come to rest, for one or more reels, in successive games.

Referring now to reel two 902, shown in FIG. 13A-C, in game one (FIG. 13A), when the reels come to rest, reel two 902 displays no consecutive identical symbols in the game display 900, though four consecutive Q's are present on the reel strip and would have been seen by the player as the reel was spinning. In game two (FIG. 13B), when the reels come to rest, reel two 902 displays two 7's in the game display 900, though three consecutive 7's are present on the reel strip and would have been seen by the player as the reel was spinning. As is apparent, the consecutive identical symbols in game one, reel two and game two, reel two need not be the same identical symbols. In game three (FIG. 13C), when the reels come to rest, reel two 902 displays no identical consecutive symbols in the game display 900 or otherwise.

Referring now to reel three 903, shown in FIG. 13A-C, in game one (FIG. 13A), when the reels come to rest, reel three 903 displays no consecutive identical symbols in the game display 900 or otherwise. In game two (FIG. 13B), when the reels come to rest, reel three 903 displays one J and two Q's in the game display 900, though two consecutive J's and six consecutive Q's are present on the reel strip and would have been seen by the player as the reel was spinning. In game three (FIG. 13C), when the reels come to rest, reel three 903 displays three consecutive K's in the game display 900 and a total of seven consecutive K's on the reel strip.

Referring now to reel four 904, shown in FIG. 13A-C, in game one (FIG. 13A), when the reels come to rest, reel four 904 displays one J and two A's in the game display 900, though two consecutive J's and six consecutive A's are present on the reel strip and would have been seen by the player as the reel was spinning. In game two (FIG. 13B), when the reels come to rest, reel four 904 displays one J and two 7's in the game display 900, though five consecutive J's and three consecutive 7's are present on the reel strip and would have been seen by the player as the reel was spinning. In game three (FIG. 13C), when the reels come to rest, reel four 904 displays two consecutive Q's in the game display 900, though three consecutive Q's and two consecutive K's are present on the reel strip and would have been seen by the player as the reel was spinning.

Referring now to reel five 905, shown in FIG. 13A-C, when the reels come to rest, no consecutive identical symbols are displayed in the game display 900 or otherwise for any game. This could be the case for one or more reels, in one or more games, in an embodiment.

At the end of each game, wins may be calculated. For example, at the end of game three (FIG. 13C), a win may be calculated based upon the three K's in the middle of the first row and the K in the bottom left symbol position and the bottom right symbol position (shown as shaded). Any payline known in the art may be utilized to calculate wins. Similarly, any scatter pattern (or other known win methodology) known in the art could be used to calculate wins. Wild or bonus symbols may be utilized within and throughout the game to increase excitement and calculate wins.

In an embodiment, the inventive system may replace some or all of the consecutive identical symbols with another consecutive identical symbol. In some embodiments, the symbol replacement occurs on only one designated reel. In other embodiments, the symbol replacement may occur on any reel. In still another embodiment, the symbol replacement may occur on multiple reels.

In an embodiment, the consecutive identical symbols are placeholder or mystery symbols that will be replaced with another consecutive identical symbol. In an embodiment, the replacement does not occur until after the reels have stopped spinning. In an embodiment, the system displays a visual indicator of the fact that a symbol replacement is imminent.

In an embodiment, the replacement of some or all of the consecutive identical symbols with another consecutive identical symbol is a smart replacement. In this smart replacement schema, the system may do one or more of the following: evaluate the symbols that are displayed after the reels have stopped for potential winning combinations, determine which original symbols should be replaced for the greatest potential win, determine which replacement symbols should replace those original symbols for the greatest potential win, and replace the symbols accordingly. The smart replacement schema may evaluate one or more outcomes in order to determine the most advantageous replacement for the participant.

In an embodiment, the replacement feature only occurs when a triggering event occurs. The triggering event may comprise any trigger known in the art. In an example, the trigger may comprise a symbol or set of symbols with different colors. In another example, the trigger may comprise a box, circle, or frame that surrounds, highlights or illuminates certain reels or symbols. In another example, the trigger may be the display of a certain symbol. The trigger, in an embodiment, may be the fact that the participant has won a certain number of games, obtained a certain number of points or monetary value, lost a certain number of games, or lost a certain number of points or monetary value. In an embodiment, the trigger may be based upon the number of games played in total or by the individual participant. In another embodiment, the trigger may be based upon a timer.

In another embodiment, if none of the displayed consecutive identical symbols are involved in a winning outcome, those consecutive identical symbols become "locked" in place for a certain period of time or number of games. In an embodiment, the symbols are locked in place until they are involved in a winning outcome. In an embodiment, the locking in place means that the reel does not spin and the displayed symbols do not change. In another embodiment, the locking in place means that the particular reel strip is not replaced between games, but may still spin on the reel and different symbols within the reel strip may be displayed when the reels stop spinning. In an embodiment, a lock symbol is displayed when this feature is activated. In an embodiment, the locking feature only occurs when a triggering event, as discussed above, occurs.

Figure 15:
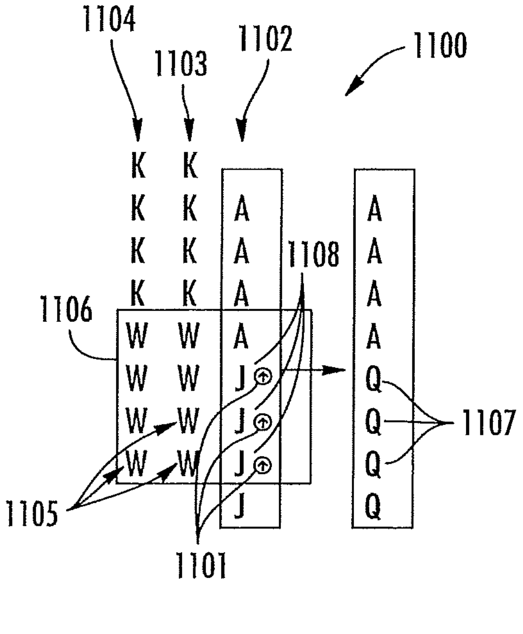
FIG. 15 is a schematic representation of reel strips in an embodiment of the present invention.

In an embodiment (FIG. 15), a particular reel strip upgrade 1100 is shown. In this embodiment, certain of the consecutive identical symbols within a reel strip 1102 may contain upgrade indicators (i.e. different color, different shape, arrow, star, encircled, etc.) 1101 which, when displayed, may cause the processor to upgrade, or substitute, some or all of the consecutive identical symbols 1108 with a symbol having a higher value 1107. For example, the upgrade could be hierarchical. If "jacks" are displayed as the consecutive identical symbols 1108 when the reels stop and those "jacks" have the required upgrade indicator 1101, the processor may upgrade them to "queens," 1107 "kings," or "aces," each being one step up in the hierarchy or having a greater point/monetary value. In some embodiments, the upgrade occurs if the consecutive identical symbols with upgrade indicators 1101 are positioned next to one or more wilds 1105, in a row or column. The wilds could, in some embodiments, be in the same reel strip 1102 or within different reel strips 1103 and/or 1104. In some embodiments, the processor enables the consecutive identical symbols to be displayed with upgrade indicators 1101 when they are positioned near one or more wilds. In other embodiments, the upgrade indicators 1101 are present on the consecutive identical symbols on the reel strip 1102 before its selection by the processor. In some embodiments, all consecutive identical symbols on the reel strip are upgraded in accordance with this feature. In other embodiments, only the consecutive identical symbols that are displayed to the participant within the game display 1106 are upgraded in accordance with this feature.

In a particular embodiment, if the consecutive identical symbols have upgrade indicators 1101, the relevant symbols are upgraded one level within the hierarchy. This may or may not be displayed to the participant. The processor then determines whether the participant has won any points/monetary value in the game. If not, the processor may then upgrade the relevant symbols another level within the hierarchy. Again, this may or may not be displayed to the participant. The processor then determines whether the participant has won any points/monetary value. If not, the processor may repeat the process until the participant wins a game or until there are no further possible upgrades.

In yet another embodiment, the system may upgrade one or more consecutive identical symbols without requiring any upgrade indicator or other visual indicator in order to make the upgrade. The upgrade may be random or may require a hidden trigger. The trigger could be any known in the art. Similarly, the upgrade may occur based upon the display or presence of a particular symbol. For example, the display or presence on a reel strip of a "J" (or any other symbol) within the consecutive identical symbols in any game could trigger one or more upgrade actions.

Advantageously, the inventive system, device and game provides a novel and stimulating variation on the basic reel-based slot game, yet complies with the strict regulatory restrictions set forth for the gaming industry. In an ordinary reel-based slot game, the reels (or the reel strips) do not change for each game played. The only variation in the game is where the reels will stop, thereby limiting the number of possible player experiences. Thus, game manufacturers attempt to distinguish their games based upon the theme of the game or vivid graphics—jungle animals or green leprechauns. The underlying method of playing the game remains the same, however.

In the present invention, the consecutive identical symbols that appear on the various reel strips provide a new layer of excitement to the player. When the player sees a particular symbol repeating as the reel spins, and particularly if the player sees the same identical symbol on another reel within the set, the player thinks there is a higher likelihood of a potential win and becomes excited. As the reels slow and the symbols lock into place, the player waits with anticipation to see if any symbols will match up, be positioned along the various paylines, or will fall into various other winning combinations. This provides a significantly higher level of player excitement because it provides a greater expectation of winning.

Additionally, the inventive system is accompanied with new features and more unusual features than traditional games offer. For example, no existing games provide the highest number of identical consecutive symbols as soon as you sit down, gradually reducing the number of identical consecutive symbols until none are shown, and then restarting the process again, providing a high number of consecutive identical symbols. Further, the inventive system also mixes in groups of identical symbols within a single reel, a feature that provides an even higher level of player excitement because with two or more groups of identical symbols, the player may become excited about winning with either of the identical options. The player feels that they have an even greater likelihood of winning due to the consecutive groups of identical symbols, even if the groups are not consecutive with one another.

As will be appreciated by one skilled in the relevant field, the present invention may be, for example, embodied as a computer or gaming system, a method, or a computer or gaming program product. Furthermore, particular embodiments may take the form of a computer or gaming program product stored on a computer-readable storage medium having computer-readable instructions (e.g., software) embodied in the storage medium. Various embodiments include web-implemented computer software. Examples of suitable computer-readable storage medium may include, for example, hard disks, compact disks, DVDs, optical storage devices, and/or magnetic storage devices.

The computer program instructions may be loaded onto and execute on a gaming device, a gaming server, a gaming machine, a general purpose computer, a special purpose computer, smart mobile device, or other programmable data processing apparatus to produce a machine. The computer program instructions may be stored in a computer-readable memory that can direct a computer or other programmable data processing apparatus to function in a particular manner such that the instructions stored in the computer-readable memory produce an article of manufacture that is configured for implementing the functions described herein. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein.

Figure 7:
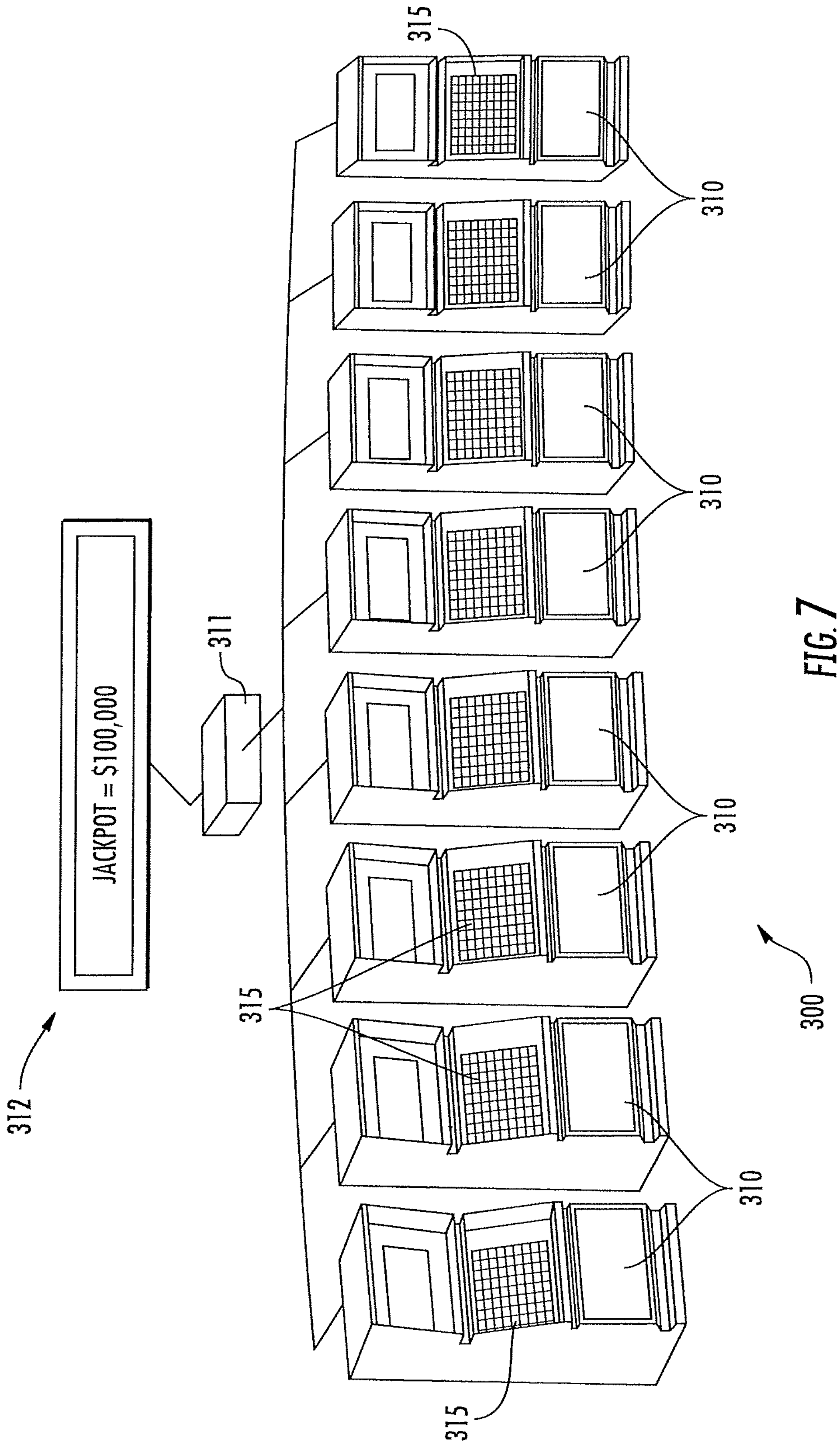
FIG. 7 shows a perspective view of a number of linked gaming machines in an embodiment of the invention.

The inventive system, as shown in FIG. 7, may be a linked system. In this embodiment, a plurality of gaming machines 310 may be arranged side-by-side, near one another, in a particular area, or spread out. In an embodiment, a common jackpot prize display 312 may be viewable from each gaming machine 310. Each gaming machine 310 may have a display unit 315. Each of the gaming machines 310 may be electronically linked to one another and, optionally, a jackpot prize display 312 through a control module 311. A win of the jackpot prize may be triggered by specific outcomes. Players may be made aware of a jackpot award by means of the common display 312. It will be appreciated that the linked machines may form part of Local Area Networks (LAN) or Wide Area Networks (WAN).

Figure 8:
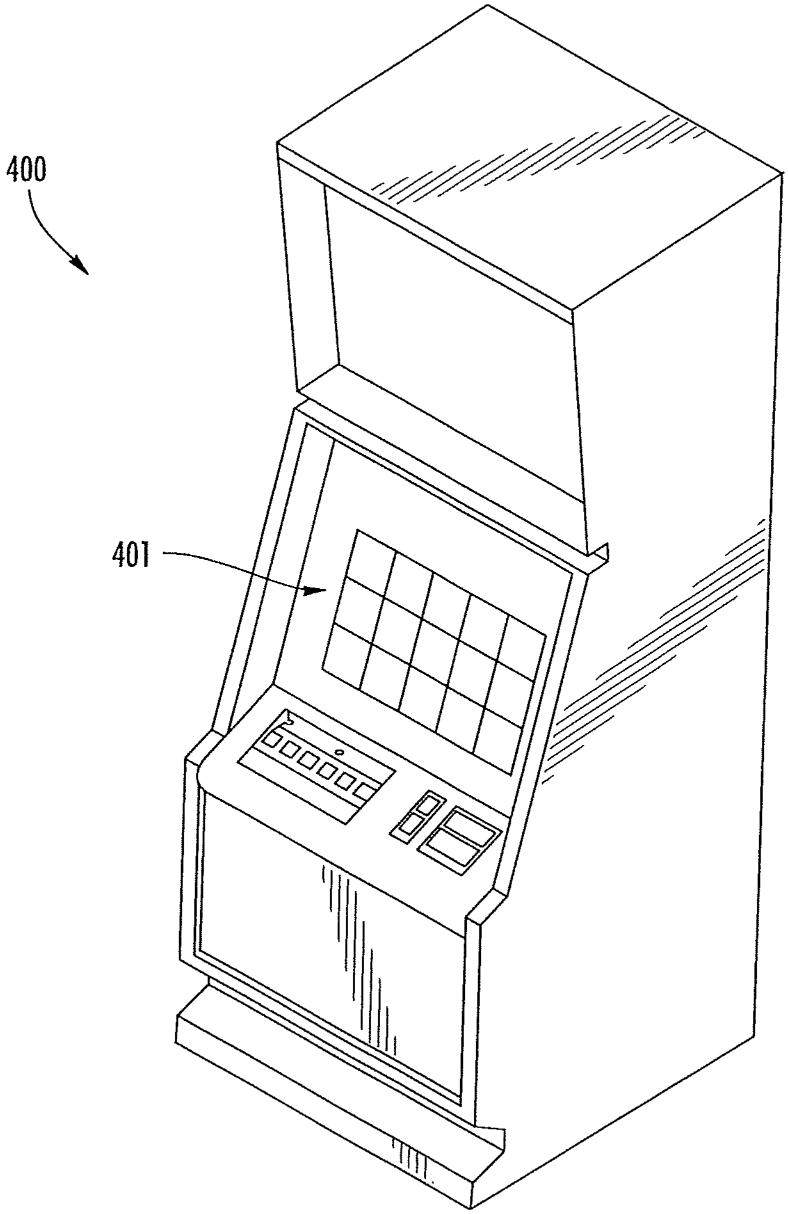
FIG. 8 shows a front view of a stand-alone gaming machine in an embodiment of the invention.

In another embodiment, the inventive system may be operable in a standalone capacity, on a gaming machine 400 (FIG. 8). The gaming machine may have a single display panel 401, double display panel (not shown), or may comprise any other configuration known in the art.

Figure 9:
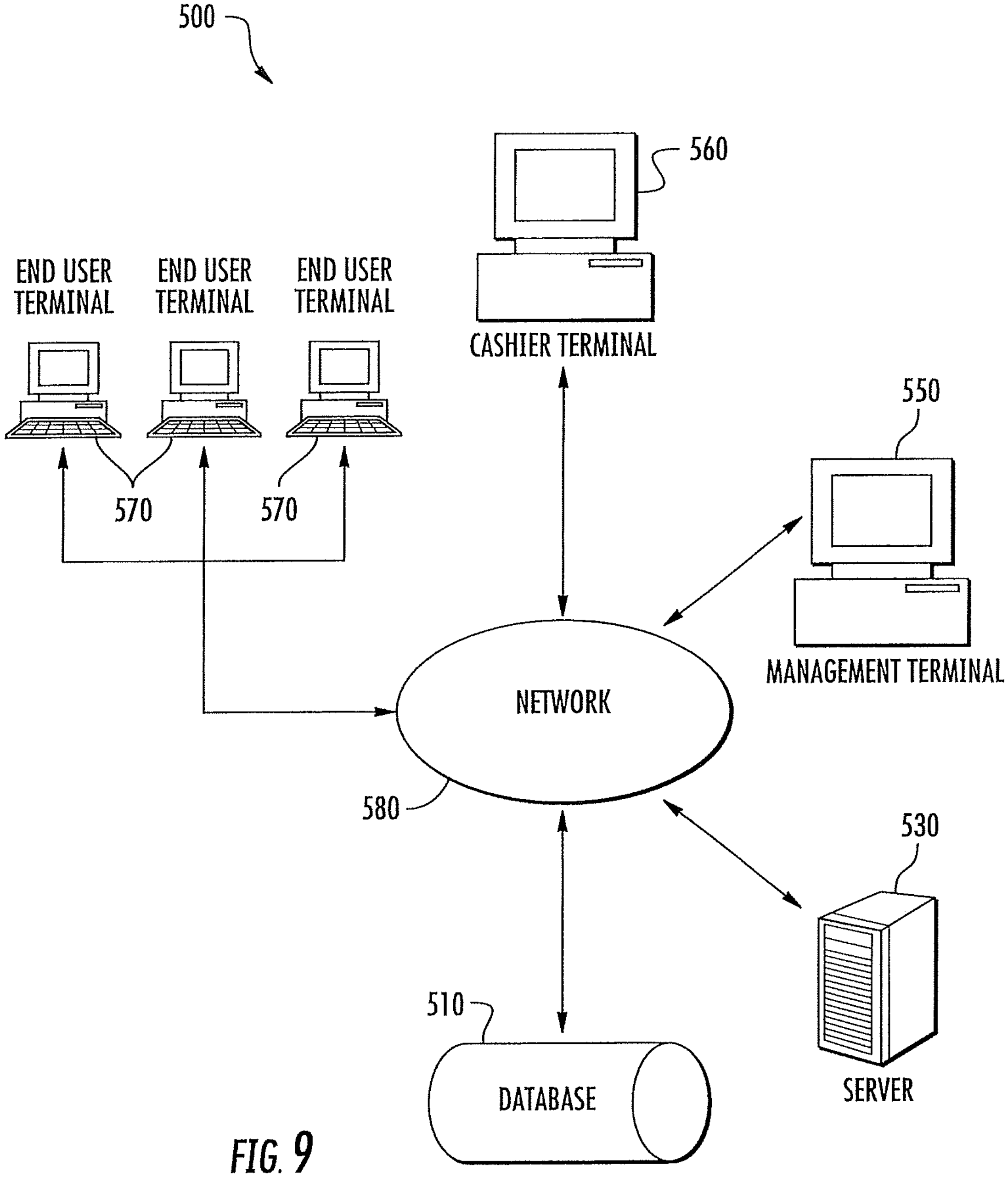
FIG. 9 is a schematic representation of the system in an embodiment of the present invention.

By way of example, and with reference to FIG. 9, in an embodiment, the inventive system 500 may comprise a network 580, a database 510, at least one server 530, optionally, at least one management terminal 550, optionally, at least one cashier terminal (also known as a point-of-sale terminal or POS terminal) 560, and one or more end user terminals 570, or any combination thereof. Those skilled in the art with reference to this disclosure should appreciate that other configurations may be used to accomplish the methods described herein without departing from the scope of the present invention. For example, in various embodiments, the cashier terminal 560 and the end user terminals 570 may comprise the same device.

It should be understood that each of the computing devices, including the server 530, the management terminal 550, the POS terminal 560, and the one or more end user terminals 570 may each have a computer hardware processor, input and output devices (for example, a computer monitor, a keyboard, selection buttons, and/or mouse) and at least one storage device (for example, memory, hard drives, etc.). These devices may also have network connection cards to connect to the network. At least some of these devices may also include a computer readable medium, which is further described herein.

The server 530 may be configured to communicate data to and from various devices in the system and to perform one or more method steps, as detailed below. The database 510 may contain various types of data and computer instructions for performing at least some of the steps presented herein. It should be understood that the network 580 may be comprised of multiple servers 530 and multiple databases 510, whether located locally and networked through a LAN or remotely through a WAN or an Intranet connection. The end user terminals 570 may be linked together via a network. Each end user terminal 570 may be a standalone gaming device, a kiosk, a personal computer (PC), a smart phone, a tablet, or other computing device.

The POS terminal 560 and/or the end user terminals 570 may allow a user to purchase game plays. In some embodiments, a user account card may be issued by the POS terminal 560, which contains an electronic account detailing user account information. The user account card may be used at the end user terminals 570 to participate in the games described herein.

A POS terminal 560 (through a cashier or directly) may provide the user with a receipt containing a code (such as a 16-digit hexadecimal code), a PIN, or a username/password that the user may then use for accessing the system or to access his/her account on an end user terminal 570. In an online embodiment, the user may access the inventive system through a browser interface that may provide a similar code to the user after account creation. This code may provide access to the software and/or specifically to the customer's account on the software.

In various embodiments, the system may allow a user to deposit currency into an end user terminal 570 through a credit card reader, currency/bill acceptor, or other device as is known in the art. The management terminal 550 may be a device that is operatively connected with the POS terminal 560, end user terminals 570, and/or server 530 to run cashier reports, calculate revenues and costs, track purchases of games, track prizes awarded, and/or review other game data. Other managerial or supervisory operations may also be performed using the management terminal 550. The server 530 may control one or more operations of the game system, as discussed herein.

One or more of the devices illustrated in FIG. 9 may be connected to network 580 as previously mentioned. In one embodiment, all devices in FIG. 9 are connected to the network 580 and communicate with each other over the network 580. It should be noted that the network 580 in FIG. 1 need not be a single network (such as only the internet) and may be multiple networks (whether connected to each other or not). In another embodiment, the network may be a LAN and a WAN (e.g., the Internet) such that one or more devices (for example, server 530, management terminal 550 and database 510) are connected together via the LAN, and the LAN is connected to the WAN which in turn is connected to other devices (for example, end user terminals 570). The terms "linked together" or "connected together" refers to devices having a common network connection via a network (either directly on a network or indirectly through multiple networks), such as one or more devices on the same LAN, WAN or some network combination thereof. It should be understood that FIG. 9 is an exemplary embodiment of the present system and various other configurations are within the scope of the present system. For example, one or more of the management terminal 550, point of sale terminal 560, and end user terminals 570 may all be located in one location and server 530 may be located in another location, where all of these system components are operatively coupled by a network such as the Internet. Additionally, it should be understood that additional devices may be included in the system shown in FIG. 9 and some devices shown in FIG. 9 may be omitted from a particular inventive system, such as, by way of example, the point of sale terminal 560. In other embodiments, certain devices may perform the operation of other devices shown in the figure.

Figure 14:
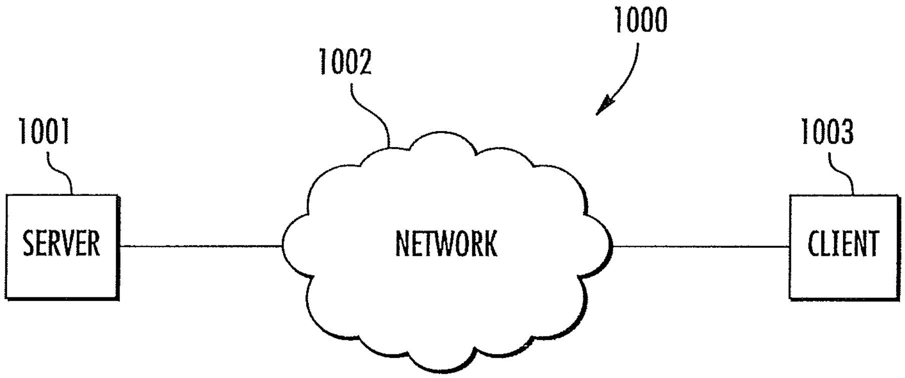
FIG. 14 is a block diagram of the system in an embodiment of the present invention.

In an embodiment, the inventive system may be available to customers online, via the internet. As shown in FIG. 14, in an embodiment, the system 1000 includes a client device 1003 that is connected to a server 1001 via a network 1002. A participant may use the client device 1003 to access the game functionality, which is hosted on the server 1001. In an embodiment, the game functionality is implemented electronically by software that runs on the server 1001. The client device 1003 may comprise any type of computing device, as discussed herein.

For purposes of this disclosure, reference to a server or processor, shall be interpreted to include: a single server, a single processor; multiple servers; multiple processors; or any combination of servers and processors. In particular embodiments of the invention, any of the end user terminal 570, the cashier terminal 560, the management terminal 550, and the server 530 may be a computer. The computer may be connected (e.g., networked) to other computers by a LAN, an intranet, an extranet, and/or the Internet. The computer may operate in the capacity of a server or a client computer in a client-server network environment, or as a peer computer in a peer-to-peer (or distributed) network environment. The computer may be a PC, a tablet, a hand-held device, a set-top box (STB), a Personal Digital Assistant (PDA), a web appliance, a server, or any computer capable of executing a set of instructions (sequential or otherwise) that specify actions to be taken by that computer. Further, the term "computer" may also include any collection of computers that individually or jointly execute a set (or multiple sets) of instructions to perform any one or more of the methodologies discussed herein.

In some embodiments, the computer architecture may include a processor, a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), and a data storage device, which communicate with each other via a bus.

The processor may be one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor may be configured to execute processing logic for performing various operations and steps discussed herein.

The computer architecture may further include a network interface device. The computer architecture also may include a video display (e.g., a liquid crystal display (LCD) or a cathode ray tube (CRT)), an alphanumeric input device (e.g., a keyboard), a cursor control device (e.g., a mouse), and a signal generation device (e.g., a speaker).

The data storage device may include a machine accessible storage medium (also known as a non-transitory computer-accessible storage medium, a non-transitory computer-readable storage medium, or a non-transitory computer-readable medium) on which is stored one or more sets of instructions embodying any one or more of the methodologies or functions described herein. The system may also reside, completely or at least partially, within the main memory and/or within processing device during execution thereof by a computer. The main memory and processing device also constitute computer-accessible storage media. Instructions may further be transmitted or received over a network via a network interface device.

While the machine-accessible storage medium may be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media. The game system that resides on server 530 may provide various functionalities as discussed herein. In various embodiments, the participant may access the inventive games through end user terminal 570.

Figure 12:
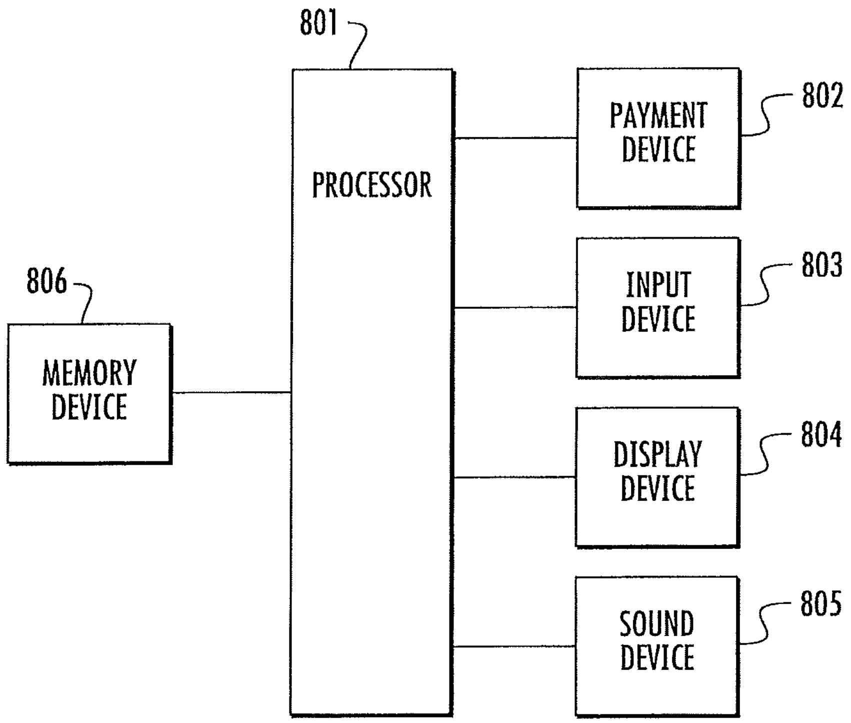
FIG. 12 is a block diagram of the system in an embodiment of the present invention.

In an embodiment, shown in FIG. 12 and as discussed in detail above, the processor 801 may communicate with a payment device 802, one or more input devices 803, one or more display devices 804, a sound device 805, and a memory device 806. The payment device may comprise a note, ticket or bill acceptor, wherein the player inserts paper money, a ticket or voucher. The payment device may comprise a coin slot where the player inserts coins or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, RFID or any other suitable wireless device which communicates a player's identification, credit totals (or related data) and other relevant information to the gaming device.

In one embodiment, one or more gaming devices 570 are in communication with each other and/or at least one central server 530, central controller or remote host through a data network 580 or remote communication link. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

A gaming device as described herein can be configured to enable a player to immediately begin playing the game upon a wager on the game or a payment to play the game. In one embodiment, the player must make a minimum wager before the gaming device enables the game. That is, the processor does not select the inventive reel strips until the player's wager meets a predetermined threshold. Instead, the system may provide the player with a set of standard reels. In an alternative embodiment, the inventive game is configured as a secondary or bonus game. In one such embodiment, if a predetermined triggering event occurs in a primary game, the game device is configured to enable a player to play the inventive game. In one embodiment, the triggering event in the primary game may not occur until the player has made a minimum wager on the primary game.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel strip combination, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first win outcome of $10 which will be provided to a first player regardless of how the first player plays in a first game and a second gaming device to have selected elements marked in a different predetermined pattern is provided a second win outcome of $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In any of the discussed embodiments, a predetermined game outcome value is determined for each of a plurality of linked or networked gaming devices based on the results of a bingo, keno or lottery game and a predetermined set of reel strips will be displayed to the player in association with the predetermined game outcome. In this embodiment, the set of predetermined reel strips (and the reels in general) will not determine the win, but will instead be selected as a result of (or in association with) the win (the predetermined game outcome value). Thus, predetermined game outcome value of a bingo game is $10, the inventive system may select a set of reel strips that will display a visual pattern of symbols that equals a $10 win.

Many modifications and other embodiments of the invention will come to mind to one skilled in the art to which this invention pertains having the benefit of the teachings presented in the foregoing descriptions and the associated drawings. While examples discussed above cover the use of the invention in the context a content management service, the invention may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A machine for entertainment of playing one or more consecutive games, comprising:

a plurality of reels, each reel having a plurality of reel sequential symbol positions;

a matrix comprising a matrix height of a predetermined number of the reel sequential symbol positions and a matrix width of the number of reels, on which a play of a game and an outcome of the play of the game is displayed;

a plurality of reel strips, each having a first set of consecutive symbol positions and a second set of consecutive symbol positions, said each symbol position associated with one of a plurality of symbols randomly selected and said second set of consecutive symbol positions comprising at least two identical symbols of the plurality of symbols and for each subsequent one of the one or more games the second set of consecutive symbol positions comprising a number of consecutive identical symbols different than the number in the second set in the prior play of the game;

a device configured for selecting for play of the game a respective one of the plurality of reel strips for each of the reels, which first set and second set of consecutive symbol positions populates the plurality of reel sequential symbol positions for the respective reel;

a display for displaying the matrix during and after the play of the game; and means for moving the plurality of reels during play of the game, whereby each of reels moves the reel sequential symbol positions through the display until the movement of the reels stops and whereupon the display displays the symbols in the matrix of the sequential symbol positions in the predetermined matrix height and matrix width.

2. The machine as recited in claim 1, wherein the number of identical symbols in the second set of consecutive symbol positions is selected from a range from a first number to a second number randomly prior to the play of the game, the second number is greater than the first number.

3. The machine as recited in claim 1, wherein the number of reel sequential symbol positions is the number of symbol positions in the first set of consecutive symbol positions plus the number of symbol positions of the second set of consecutive symbol positions.

4. The machine as recited in claim 1, wherein the moving of the reels occurs for a predetermined period.

5. The machine as recited in claim 1, wherein the number of consecutive symbol positions in the first set for one of the reels is determined prior to the one or more play of the game using the machine.

6. The machine as recited in claim 1, wherein the number of consecutive symbol positions in the second set for each of the reels is determined prior to the one or more play of the game using the machine.

7. The machine as recited in claim 1, wherein the matrix width is predetermined randomly in a range of a first number to a second number of reels prior to the one or more play of the game using the machine.

8. The machine as recited in claim 1, wherein the number of consecutive identical symbols in the second set of consecutive symbol positions for a respective subsequent one of the one or more games is less than the number in the second set in the prior play of the game.

9. The machine as recited in claim 1, wherein the number of consecutive identical symbols in the second set of consecutive symbol positions for a respective subsequent one of the one or more games is more than the number in the second set in the prior play of the game.

10. The machine as recited in claim 1, further comprising a microprocessor computer device configured with software instructions for providing the reels, the plurality of reel strips, and moving the plurality of reels during a play of the game.

11. The machine as recited in claim 1, wherein the number of consecutive symbol positions in the first set and the number of consecutive symbol positions in the second set are the same for each reel strip.

12. The machine as recited in claim 1, wherein the number of consecutive symbol positions in the first set and the number of consecutive symbol positions in the second set are different.

13. The machine as recited in claim 1, wherein the number of consecutive symbol positions in the first set and the number of consecutive symbol positions in the second set are different for each reel strip.

14. The machine as recited in claim 1, wherein each of the plurality of reel strips comprise different identical symbols within the respective second set of consecutive symbol positions.

15. The machine as recited in claim 1, wherein the symbols within the first set of consecutive symbol positions are not consecutively identical.

16. The machine as recited in claim 1, wherein a first one of the reel strips comprises at least one symbol within the first set of consecutive symbol positions that is different from a symbol within the first set of consecutive symbol positions of a second one of the reel strips.

17. The machine as recited in claim 1, wherein a first one of the reel strips comprises a plurality of symbols within the first set of consecutive symbol positions that are different from the symbols within the first set of consecutive symbol positions of a second one of the reel strips.

18. The machine as recited in claim 1, wherein one or more of the identical symbols in the second set of consecutive symbol positions includes an upgrade indicator that upon display in the matrix after play of the game causes the identical symbol to upgrade to a different symbol of the plurality of symbols having a value greater than a value of the identical symbol optionally, (i) for the one identical symbol, (ii) for more than one of the identical symbols, or (iii) for all of the consecutive identical symbols.

19. The machine as recited in claim 18, wherein the upgrade occurs if the consecutive identical symbol with the upgrade indicator is displayed adjacent a wilds symbol in the matrix.

20. The machine as recited in claim 18, whereupon determining that the upgrade did not result in a win for the player of the game, repeating the upgrade to provide a subsequent higher value symbol of the plurality of symbols.

21. The machine as recited in claim 18, wherein the upgrade occurs randomly.

22. The machine as recited in claim 18, wherein the upgrade occurs in response to display of a trigger symbol in the matrix.

23. The machine as recited in claim 18, wherein the game restarts with at least two consecutive identical symbols after play of a game with less than two consecutive identical symbols.

24. The machine as recited in claim 18, wherein the second set of consecutive symbol positions comprises:

a first sequential number of consecutive symbol positions having the at least two identical symbols of the plurality of symbols; and a second set of consecutive symbol positions each having a second at least two identical symbols of the plurality of symbols different from the at least two identical symbols.

25. A method of playing one or more consecutive games on a machine for entertainment comprising the steps of:

(a) providing a plurality of reels, each reel having a plurality of reel sequential symbol positions;

(b) defining a matrix comprising a matrix height of a predetermined number of the reel sequential symbol positions and a matrix width of the number of reels, on which a play of a game and an outcome of the play of the game is displayed;

(c) selecting a reel strip from a plurality of reel strips, each reel strip having a first set of consecutive symbol positions and a second set of consecutive symbol positions, said each symbol position of the first set of consecutive symbol positions populated with a respective one of a plurality of the symbols randomly selected and said second set of consecutive symbol positions comprising at least two identical symbols of the plurality of symbols, and for each subsequent one of the one or more games the second set of consecutive symbol positions comprising a number of consecutive identical symbols different than the number in the second set in the prior play of the game;

(d) selecting a respective one of the plurality of reel strips for each of the reels, which first set and second set of consecutive symbol positions populates the plurality of reel sequential symbol positions for the respective reel;

(e) providing a display for display of the matrix during and after the play of the game; and (f) moving the plurality of reels during the play of the game, whereby each of reels moves the reel sequential symbol positions through the display until stopped and the display thereafter displays the symbols in the matrix of the sequential symbol positions.

26. The method as recited in claim 25, further comprising the step selecting randomly the number of identical symbols in the second set of consecutive symbol positions from a range of a first number to a second number prior to the play of the game, the second number greater than the first number.

27. The method as recited in claim 25, wherein the number of reel sequential symbol positions is the number of symbol positions in the first set of consecutive symbol positions plus the number of symbol positions of the second set of consecutive symbol positions.

28. The method as recited in claim 25, further comprising the step of moving the reels for a predetermined period.

29. The method as recited in claim 25, further comprising the step of determining the number of consecutive sequential symbol positions for one of the reels prior to the one or more play of the game using the machine.

30. The method as recited in claim 29, wherein the determining the number of consecutive sequential symbol positions comprises selecting the number from a range of a first number to a second number.

31. The method as recited in claim 25, further comprising the step of determining the number of consecutive sequential symbol positions in the second set for each of the reels sequentially prior to the one or more play of the game using the machine.

32. The method as recited in claim 31, wherein determining the number of consecutive sequential symbol positions in the second set comprises selecting from a range of a first number to a second number.

33. The method as recited in claim 25, further comprising the step of determining randomly the matrix height of the number of the reel sequential symbol positions in a range of a first number to a second number of sequential symbol positions prior to the one or more play of the game using the machine.

34. The method as recited in claim 25, further comprising the step of determining randomly the matrix width in a range of a first number to a second number of reels prior to the one or more play of the game using the machine.

35. The method as recited in claim 25, wherein the number of consecutive identical symbols in the second set of consecutive symbol positions for a respective subsequent one of the one or more games is less than the number in the second set in the prior play of the game.

36. The method as recited in claim 25, wherein the number of consecutive identical symbols in the second set of consecutive symbol positions for a respective subsequent one of the one or more games is more than the number in the second set in the prior play of the game.

37. The method as recited in claim 25, further comprising the step of providing a microprocessor computer device configured with software instructions for providing the reels, the plurality of reel strips, and moving the plurality of reels during a play of the game.

38. The method as recited in claim 25, wherein the number of consecutive symbol positions in the first set and the number of consecutive symbol positions in the second set are the same for each reel strip.

39. The method as recited in claim 25, wherein the number of consecutive symbol positions in the first set and the number of consecutive symbol positions in the second set are different.

40. The method as recited in claim 25, wherein the number of consecutive symbol positions in the first set and the number of consecutive symbol positions in the second set are different for each reel strip.

41. The method as recited in claim 25, wherein each of the plurality of reel strips comprise different identical symbols within the respective second set of consecutive symbol positions.

42. The method as recited in claim 25, wherein the symbols within the first set of consecutive symbol positions are not consecutively identical.

43. The method as recited in claim 25, wherein a first one of the reel strips comprises at least one symbol within the first set of consecutive symbol positions that is different from a symbol within the first set of consecutive symbol positions of a second one of the reel strips.

44. The method as recited in claim 25, wherein a first one of the reel strips comprises a plurality of symbols within the first set of consecutive symbol positions that are different from the symbols within the first set of consecutive symbol positions of a second one of the reel strips.

45. The method as recited in claim 25, further comprising the steps of providing an upgrade indicator for one or more of the identical symbols in the second set of consecutive symbol positions; and upon display of the upgrade indicator in the matrix after play of the game, upgrading the identical symbol to a different symbol of the plurality of symbols having a value greater than a value of the identical symbol optionally, (i) for the one identical symbol, (ii) for more than one of the identical symbols, or (iii) for all of the consecutive identical symbols.

46. The method as recited in claim 45, wherein the upgrade occurs if the consecutive identical symbol with the upgrade indicator is displayed adjacent a wilds symbol in the matrix.

47. The method as recited in claim 45, whereupon determining that the upgrade did not result in a win for the player of the game, repeating the upgrade to provide a subsequent higher value symbol of the plurality of symbols.

48. The method as recited in claim 45, wherein the upgrade occurs randomly.

49. The method as recited in claim 45, wherein the upgrade occurs in response to displaying a trigger symbol in the matrix.

50. The method as recited in claim 45, wherein the game restarts with at least two consecutive identical symbols after play of a game with less than two consecutive identical symbols.

51. The method as recited in claim 45, wherein providing the second set of consecutive symbol positions comprises the steps of:

providing a first sequential number of consecutive symbol positions having the at least two identical symbols of the plurality of symbols; and providing a second set of consecutive symbol positions each having a second at least two identical symbols of the plurality of symbols different from the at least two identical symbols.

* * * * *